(12) United States Patent
Pierson

(10) Patent No.: US 7,314,209 B2
(45) Date of Patent: Jan. 1, 2008

(54) STUB OUT FLUID QUICK CONNECTOR WITH SHUT OFF VALVE INTERFACE

(75) Inventor: Erik E. Pierson, Ortonville, MI (US)

(73) Assignees: Cooper Standard Automotive, Inc., Novi, MI (US); BrassCraft Manufacturing Company, Novi, MI (US)

( * ) Notice: Subject to any disclaimer, the term of this patent is extended or adjusted under 35 U.S.C. 154(b) by 309 days.

(21) Appl. No.: 10/913,827

(22) Filed: Aug. 6, 2004

(65) Prior Publication Data

US 2006/0027776 A1    Feb. 9, 2006

(51) Int. Cl.
*F16L 37/38* (2006.01)

(52) U.S. Cl. .................... 251/149.6; 285/305
(58) Field of Classification Search ............ 251/149.6, 251/149.1; 285/305, 319
See application file for complete search history.

(56) References Cited

U.S. PATENT DOCUMENTS

| | | | |
|---|---|---|---|
| 4,819,908 A * | 4/1989 | Norkey ................... | 251/149.6 |
| 5,056,756 A * | 10/1991 | Norkey et al. ........... | 251/149.6 |
| 5,273,254 A * | 12/1993 | McNaughton et al. ... | 251/149.6 |
| 5,320,326 A | 6/1994 | Ju et al. | |
| 5,478,046 A * | 12/1995 | Szabo ..................... | 251/149.6 |
| 5,546,985 A * | 8/1996 | Bartholomew ........... | 251/149.6 |
| 5,823,508 A * | 10/1998 | Nie ......................... | 251/149.6 |
| 5,988,705 A | 11/1999 | Norkey | |
| 6,283,443 B1 * | 9/2001 | Taneya .................... | 251/149.6 |
| 6,488,320 B1 | 12/2002 | Anderson | |
| 6,637,779 B2 * | 10/2003 | Andre ..................... | 285/305 |
| 6,802,491 B1 * | 10/2004 | Kelly et al. ............. | 251/149.6 |
| 2003/0075922 A1 * | 4/2003 | Andre ..................... | 285/305 |

* cited by examiner

*Primary Examiner*—John Bastianelli
(74) *Attorney, Agent, or Firm*—Young Hasile Hanlon MacFarlane & Helmholdt PC

(57) ABSTRACT

A fluid quick connector with a shut off valve interface is mountable on a first endform, such as a building plumbing stub out. The quick connector carries a retainer at an opposite end for releasable latching of a second fluid operative element to the stub out. An internally movable shut off valve is carried in the quick connector housing and is normally biased to a fluid blocking position. Insertion of a second endform through the second end of the quick connector housing overcomes the biasing force on the valve and moves the valve to an open fluid flow position allowing fluid flow between the stub out and the second endform.

16 Claims, 5 Drawing Sheets

STUB OUT FLUID QUICK CONNECTOR WITH SHUT OFF VALVE INTERFACE

BACKGROUND OF THE INVENTION

The present invention relates, in general, to fluid quick connectors which couple fluid carrying or operative components, and, more particularly, to fluid quick connectors having an internally mounted shut off or stop valve.

Snap-fit or quick connectors are employed in a wide range of applications, particularly, for joining fluid carrying conduits in automotive and industrial applications. Such quick connectors utilize retainers or locking elements for securing one connector component, such as a tubular conduit, within a complimentary bore of another connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable retainer, the retainer is mounted within a bore in a housing of one connector component. The retainer has a plurality of radially and angularly extending legs which extend inwardly toward the axial center line of the bore in the housing. A tube to be sealingly mounted in the bore in the one component includes a radially upset portion or flange which abuts an inner peripheral surface of the retainer legs. Seal and spacer members as well as a bearing or top hat are typically mounted in the bore ahead of the retainer to form a seal between the housing and the component when the component is lockingly engaged with the retainer legs in the housing.

Radially displaceable retainers are also known in which the retainer is radially displaceable through aligned bores or apertures formed transversely to the main throughbore in the housing. The radially displaceable retainer is typically provided with a pair of depending legs which are sized and positioned to slip behind the radially upset portion or flange on the tube only when the tube is fully seated in the bore in the housing. This ensures a positive locking engagement of the tube with the housing as well as providing an indication that the tube is fully seated since the radially displaceable retainer can be fully inserted into the housing only when the tube has been fully inserted into the bore in the housing.

The above described fluid quick connectors use a tube or tube endform which meets SAE standards in terms of the raised bead height, depth, etc.

Other quick connectors utilize retainers designed to lockingly engage beadless endforms. One type of such retainers are in the form of an annular clip with a plurality of radially inward extending, flexible fingers, which engage the endform at an angle to resist pullout of the endform from the connector housing. Another type has a radially inward projection which engages a recess in the endform.

Thus, it would be desirable to provide a fluid quick connector which is slidably latchable to a stub out conduit and which carries a shut off valve movable to a flow enabling position in response to a fully inserted endform into the connector housing. It would also be desirable to provide such a fluid quick connector in which the endform cannot be fully inserted into the housing when the retainer is in the fully latched position in the housing. It would also be desirable to provide such a fluid quick connector which is latchable to an external fluid device.

SUMMARY OF THE INVENTION

The present invention is a fluid quick connector with a shut off valve interface which is mountable on a first end form for establishing selective fluid flow between the first endform and a second endform or fluid operative element also attached to the quick connector.

In one aspect the fluid quick connector of the present invention includes a housing having a bore extending between first and second end, a first retainer carried at the first end of the housing adapted for releasably latching the housing to a first endforms, a valve movably mounted in the bore and biased in a first direction to close the bore in housing to fluid flow, the valve movable oppositely by insertion of a second endform into the second end of the housing to open flow through the bore in the housing, and a second retainer carried by the housing adapted for releasably latching a second endform to the housing.

There has been disclosed a unique fluid quick connector with a shut off valve interface which is mountable on a first fluid flow endform for establishing selective fluid flow between the first endform and a second endform carried on a second fluid operative element. In an advantageous application, the present fluid quick connector can be mounted over a first endform on a stub out extending from a wall through a slide-on latching engagement with the stub out. The other end of the quick connector is operable to receive a second fluid operative element, such as a stop valve, conduit, etc., for connection to building plumbing.

The present fluid quick connector provides an easy attachment to existing building plumbing without requiring time consuming soldering of all pipe connections. This is especially advantageous during the initial pressure testing of building plumbing which requires caps to be soldered over the open ends of all stub outs before the system is pressurized. The caps are subsequently removed and other fluid conduits, stop valves, etc., connected to the stub outs in a normal fashion. The present connector replaces all of the soldering by slide-in latchable connections.

The present fluid quick connector eliminates these time consuming procedures by enabling a single quick connector containing a shut off valve, etc., to be attached in a simple slide-on manner to a stub out. The shut off valve prevents fluid leakage during system pressure testing. When it is necessary to attach other fluid conduits, etc., to the building plumbing, such conduits can be easily and quickly attached to the connectors or, alternately, the shut off valve may be easily unlatched from the quick connector and the other fluid conduits or fluid operative elements releasably and sealingly latched to the quick connector using the existing quick connector retainer.

BRIEF DESCRIPTION OF THE DRAWING

The various features, advantages and other uses of the present invention will become more apparent by referring to the following detailed description and drawing in which.

DETAILED DESCRIPTION

For clarity in understanding the use and operation of the present invention, reference will be had to FIGS. 1-7 which depict one aspect of a fluid quick connector 10 which lockingly couples two end forms 12 and 14.

Further, the following description of the use of the fluid quick connector 10 to connect tubular members will be understood to apply to the connection of conduits, hoses, and/or solid metal or plastic tubes to each other in fluid flow communication. The end of a conduit or tubular member inserted into the interior of one end of the quick connect is defined herein as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

Figure 1:
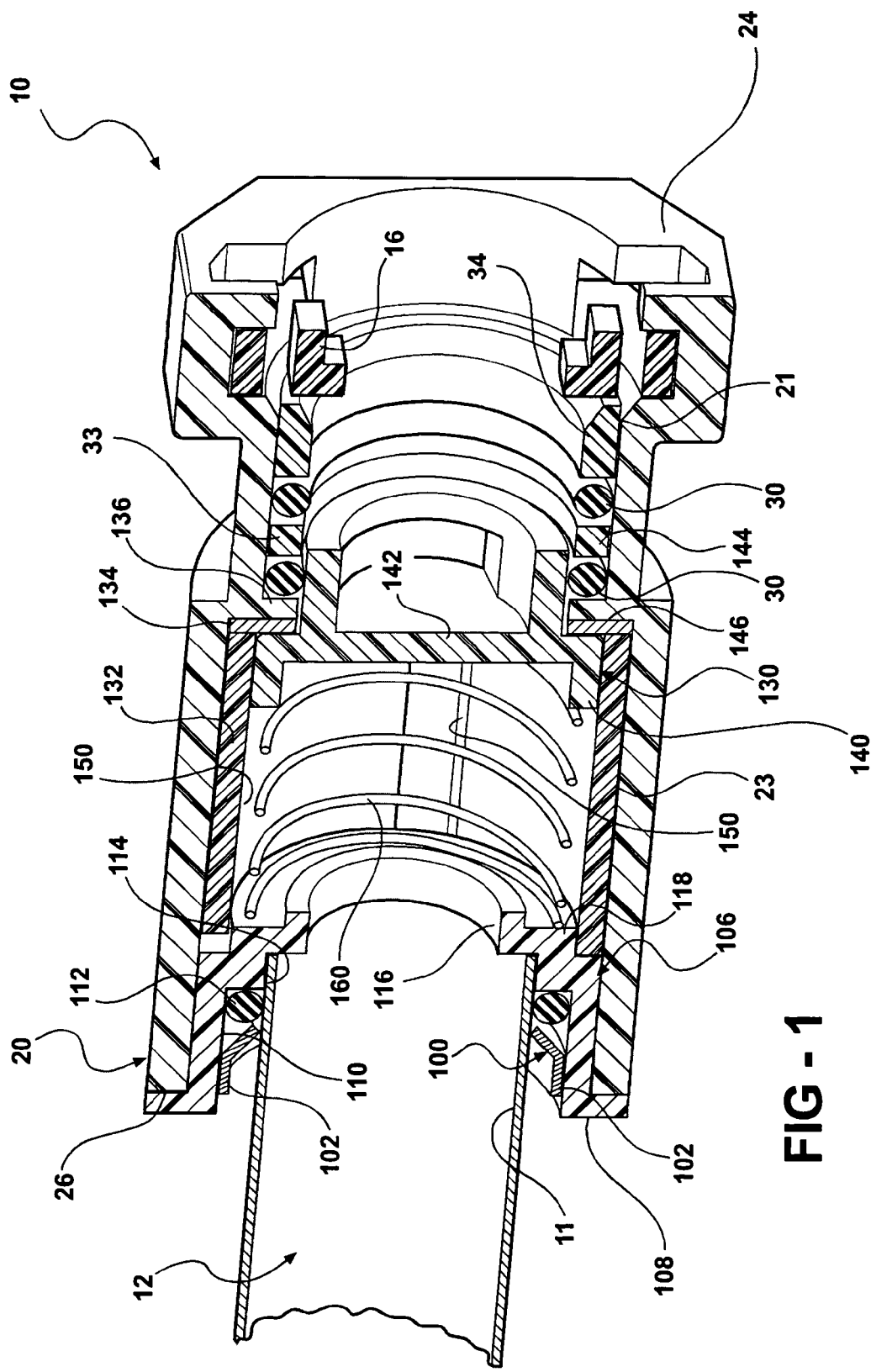
FIG. 1 is a longitudinal cross sectioned, perspective view of a fluid quick connector according to the one aspect of the present invention depicted in a closed off flow position.
Figure 2:
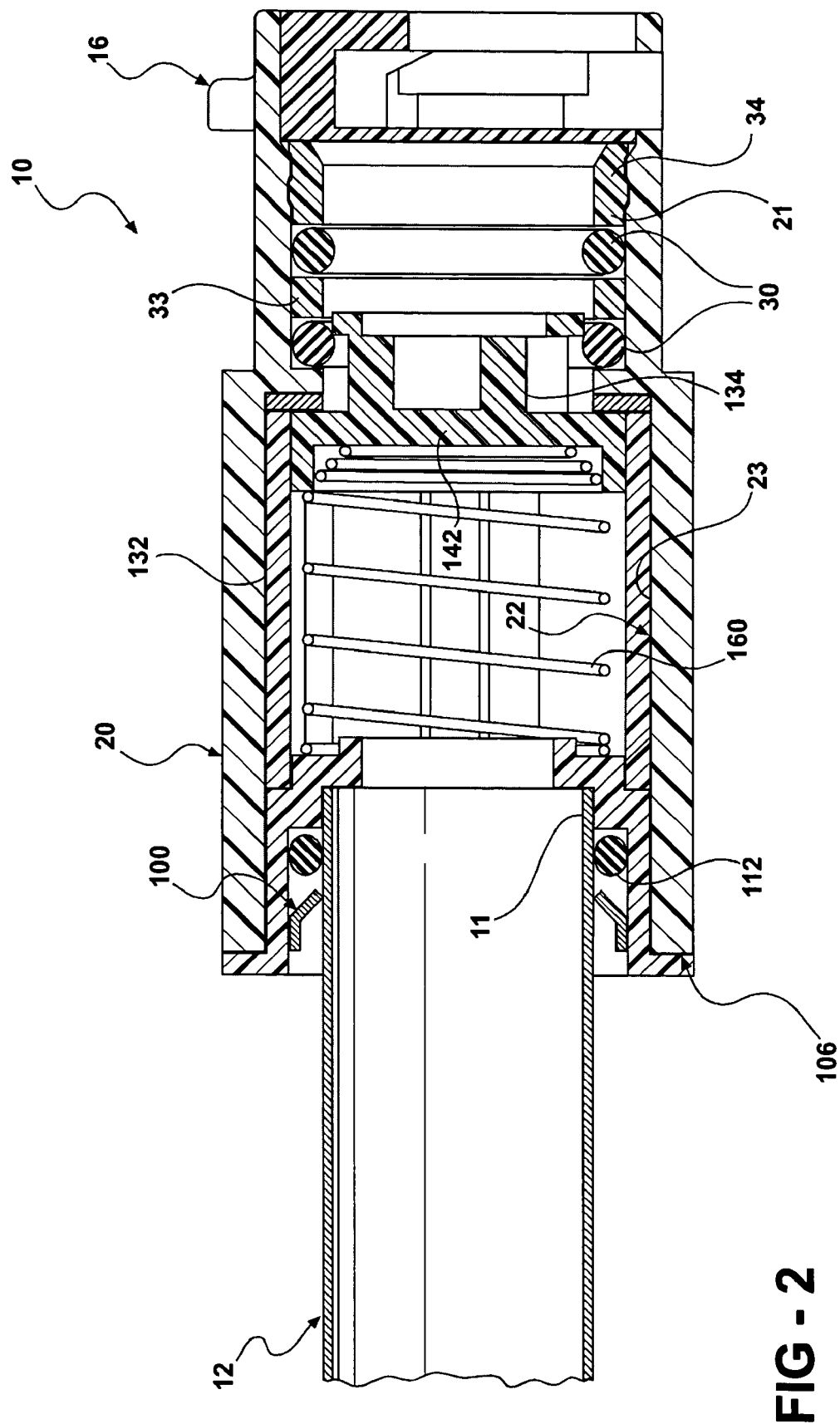
FIG. 2 is a longitudinal, cross sectional side view of the quick connector shown in FIG. 1.

The quick connector 10 includes a housing 20 having an elongated, axially extending, internal stepped bore 22, shown in detail in FIGS. 1 and 2, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23.

A top hat or bearing 34 is fixed in the first bore portion 21 immediately adjacent the first end 24 of the first bore portion 21. A seal means 30 in the form of one or two O-rings and an intermediate spacer 33 is also mounted in the first bore portion 21 between one end of the top hat 34 and a collar at the start of the second bore 23.

The inner diameter of the seal means 30 is sized to sealingly engage the outer diameter of the end portion 11 of the end form 12.

Figure 4:
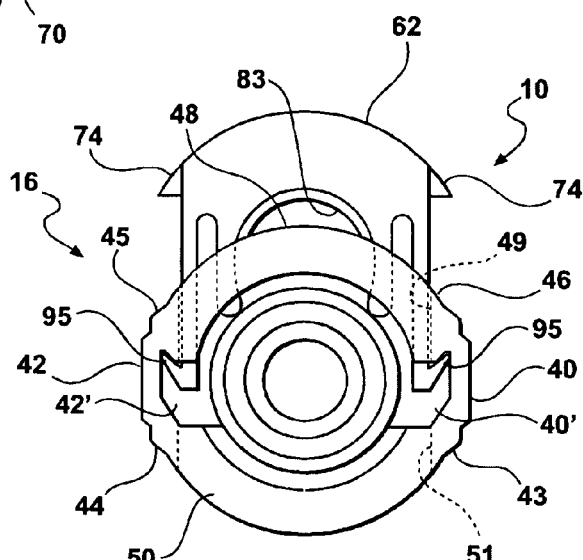
FIG. 4 is an end view of the retainer shown in FIGS. 1-3 depicted in a partially inserted, storage position in the connector body.
Figure 5:
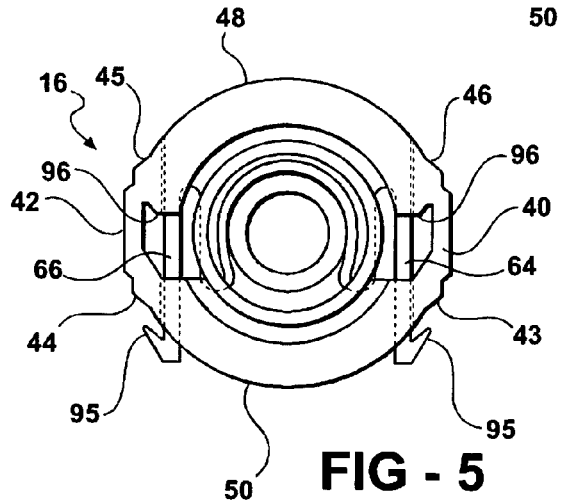
FIG. 5 is an end view of the fully latched retainer and connector body.

As shown in detail in FIGS. 4 and 5, the first end 24 of the housing 20 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 20 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 4 and 5. Apertures 49 and 51 are formed respectively in each surface 48 and 50. The apertures 49 and 51 are aligned to form a transverse bore extending through the first end 24 of the housing 20 which is disposed in communication with the throughbore in the housing 20.

The retainer 16 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 16 between opposed side edges of the side legs 64 and 66, respectively. The projections 70 are located adjacent the outer end 72 of each leg 64 and 66. The projections 70 engage surfaces on the housing 20 to position the retainer 16 in the shipping position shown in FIG. 4, or in the fully inserted, latched position shown in FIG. 5. Further, a pair of outward extending lock tabs or edges 74 are formed adjacent the end wall 62 on each side leg 64 and 66.

Figure 3:
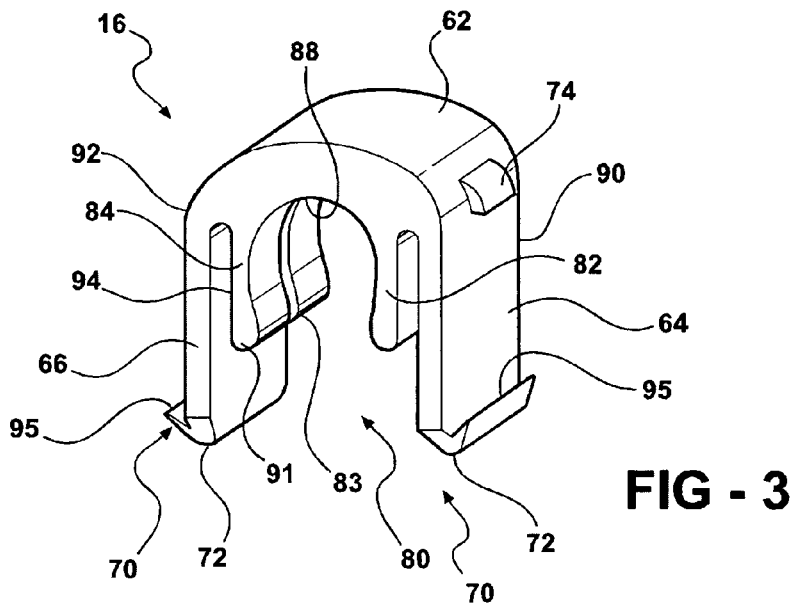
FIG. 3 is a perspective view of the retainer shown in FIGS. 1 and 2.

As shown in FIGS. 3-5, the projections 70 on the legs 64 and 66 of the retainer 16 are formed with an angled hook-like shape terminating in a tip 95. The tip 95 is disposed at an acute, upturned angle with respect to the corresponding legs 64 and 66.

Grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 16. In this manner, pull out of the retainer 16 from the housing 20 is resisted by the interlocking tips 95 on the legs 64 and 66 of the retainer 16 which are seated within the notches 96 in the grooves 40' and 42' in the housing 12 as shown in the partially inserted, shipping position of the retainer 16 in FIG. 4. The flats or lock edges 44 and 46 are disposed at an angle complimentary to the acute angle of the tips 95 on the legs 64 and 66 of the retainer 16. This enables interlock of the tips 95 with the flats 44 and 46 resists pull out of the retainer 16 from the housing 20 from the fully latched position shown in FIG. 5.

The hook shaped tips 95 on the legs 64 and 66 of the retainer 16 in conjunction with the grooves 40' and 42' in the housing 20 also provide a distinct, "avalanche effect" snap action of the retainer 16 in the housing 20. The grooves 40' and 42' in the housing 20 are formed in generally planar flat surfaces. The inner surfaces force the ends 72 of the legs 64 and 66 laterally inward toward each other when the retainer 16 is inserted into the housing 20. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 20 in either the partially inserted position, shown in FIG. 4, or the fully inserted position shown in FIG. 5.

It should be noted that further insertion force on the retainer 16 moving the retainer 16 from the partially inserted position in FIG. 4 to the fully inserted position shown in FIG. 5 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 16 can be first be installed on the housing 20 in a shipping or storage position depicted in FIG. 4. In this position, the projections 70 on the side legs 64 and 66 of the retainer 16 snap into and engage the longitudinally extending grooves 40' and 42'.

Further insertion of the retainer 16 through the aligned apertures 49 and 51 in the housing 20 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 20 as shown in FIG. 5. In this fully inserted position of the endform 14 in the housing 20, an annular locking surface recess 18 on the endform 14 is situated ahead of arms 82 and 84 of the retainer 10. This position represents the fully latched position in which the endform 14 is fully seated in and lockingly engaged with the connector housing 20. The full insertion of the retainer 16 into the housing 20 also provides visible indication of the fully locked connection of the endform 14 and the housing 20.

In this aspect of the invention, the retainer 16 includes an endform latch member in the form of an arcuate projection 83 extending radially inward between the arms 82 and 84. The projection 83 may have any one of a number of different cross sections, such as a smoothly curved, hemispherical shaped cross section, a squared off, polygonal cross section, etc. Further, the projection 83 may be continuous over a predetermined angular extent of the inner surface of the arms 82 and 84 of the retainer 10 or formed of a plurality of discrete, non-continuous, circumferentially aligned segments.

The arms 82 and 84 have an axial length between a center connecting surface 85 to tip ends 91 in the illustrated view, greater than the axial length of the projections 83. Alternately, the arms 82 and 84 and the projection 83 can be combined into a single arcuate projection with the outer surfaces spaced from the outer legs 64 and 66. Further, the projection 83 and the arms 82 and 84 can be integrally combined with the legs 64 and 66.

However, it will be understood that the cross section as well as the radial height of the projection 83 is complementary to the cross section and radial depth of the annular recess 18 in the end form 14. This provides releasable interlocking of the projection 83 in the recess 18 to latch the endform 14 in the housing 20 when the retainer 16 is moved into the fully latched position.

It will also be apparent that if the retainer 16 is in the fully latched position shown in FIGS. 1 and 5, prior to insertion of the endform 14 into the housing 20, the radially inward extent of the projection 83 blocks full insertion of the endform 14 into the housing 20. Likewise, the endform 14 must be fully inserted into the bore in the housing 20, as shown in FIG. 1, for the projection 83 to axially align with and engage the recess 18 in the endform 14 so as to enable the retainer 16 to be moved to the fully latched position shown in FIGS. 1 and 5. If the tip end 13 of the endform 14 is spaced from the fully inserted position in the bore in the housing 20 shown in FIG. 2, the projection 83 on the retainer 16 will not align with the recess 18 in the endform 14 such that the retainer 16 cannot be transversely moved into the fully latched position. When this occurs, the outer edge of the central leg 62 of the retainer 16 will extend outward from the housing 20 to provide an indication of a non-fully inserted endform 14. Further details of the construction and operation of the retainer 16 can be had by referring to U.S. Pat. No. 6,637,779, the contents of which are incorporated herein by reference.

It will be understood that the above-description of a retainer configured for releasable engagement with a recess in an endform to releasably latch the endform to the quick connector housing this is by way of example only. Other retainer and endform latching configurations, such as the retainer which engages an endform having a raised, annular SAE flange or bead, as shown in U.S. Pat. Nos. 5,542,716, 5,782,502, 5,951,063, and 5,784,502, can also be employed in the quick connector 10 of the present invention.

In addition, axially mounted retainers and quick connector housing configurations, typically employed with raised SAE flanged or beaded endforms, as shown in U.S. Pat. No. 6,402,204, may also be employed in the quick connector 10 of the present invention.

It will also be understood that the housing 20, while illustrated as having a one piece construction, may also be formed of two rotatably interconnected housing sections, as described in U.S. Pat. Nos. 6,371,529 and 6,612,622. In a two part housing configuration, one housing carries the seal elements 30 and 33 and the top hat 34; while the second housing carries the retainer 16.

Referring to FIGS. 1 and 2, the quick connector 10 includes a second retainer means 100, mounted adjacent to and partially in the second end 26 of the housing 20. The retainer means 100 may be any fluid quick connector compatible retainer, such as the transversely and axially mounted retainers described in the above-listed patents, the transversely mounted retainer 16 shown in FIG. 1., or a ring-like retainer 100, also shown in FIG. 1. By example, the retainer 100, includes a central bore for receiving the endform 12. A plurality of radially extending, flexible fingers 102 project from the central ring portion of the retainer 100 and forcibly engage the outer surface of the end portion 11 of the endform 12 to lockingly engage the endform 12 and the housing 20 after the endform 12 is inserted through the retainer 100.

In the following description, an example of one application of the quick connector 10 to the present invention is given in which the endform 12 is the end portion of a so-called "stub out". A "stub out" is referred to in the home and building plumbing industry as that portion of a typically metal tube which projects through an opening in a wall, floor, or other surface and which provides an attachment point to a fluid operative component or conduit, such as a stop valve, a fluid conduit to a toilet, faucet, etc.

While the retainer 100 can be carried on or mounted directly in the housing 20 adjacent the second end 26 of the housing 20, by example only, the retainer 100 is fixed in a sleeve 106 which is mounted in the second end 26 of the housing 20 and into the bore portion 23 of the housing 20. The carrier 106 has a stepped internal and external configuration formed of an end flange 108 which seats against the second end 26 of the housing 20, a first diameter bore portion 110 which carries the retainer 100 and a seal 112, such as an O-ring. A second smaller diameter bore 114 extends axially from a shoulder defined between the first and second bores 110 and 114 to define a bearing surface for receiving the tip end 11 of the endform 12. A third yet smaller diameter end bore portion 116 is formed at the opposite end of the carrier 106. An annular seat 118 is formed between the second and third bores 114 and 116, the purpose of which will become more apparent hereafter. The carrier 106 is press fit, ultrasonically or heat welded, etc., to the housing 20.

A check or shut off valve 130 is movably mounted in the housing 20. The valve 130 is movable within the bore portions of the housing 20 or in a cylindrical sleeve 132 which is mounted in the bore portion 23 of the housing 20. In the case of the separate sleeve 132, one end of the sleeve 132 sealingly engages a seal 134 disposed or mounted on a flange 136 formed in the housing 20 and dividing the two separate bore portions 21 and 23. The seal 134 may be a separate washer-type or labyrinth seal or a double shot seal integrally molded on the housing 20. As shown in FIG. 1, a radially inner portion of the seal 134 extends inward a sufficient distance to act as a sealing surface for the valve 130, as described hereafter.

Although the valve 130 may take a variety of forms, by example only, the valve 130 has a first cylindrical end 140 which extends from a generally planar, annular base 142. A second cylindrical portion 144 projects oppositely from the base 142 and has a smaller diameter than the first cylindrical portion 140. An annular flange 146 is formed between the outer peripheral edge of the base 142 and the second cylindrical portion 144. The flange 146 sealingly engages the seal 134 when the valve 130 is in the closed position to block all fluid flow through the housing 20, as described in greater detail hereafter.

The sleeve 132, or the inner surface of the bore 23 in a configuration where the sleeve 132 is molded as a part of the bore 23 such that the bore 23 of the housing 20 forms the surface surrounding the valve 130, includes at least one and, preferably, a plurality of circumferentially spaced, axially extending recesses or channels 150 formed in an inner surface of the sleeve 132. The recesses 150 extend substantially between the opposite ends of the sleeve 132 and form fluid flow paths from the end of the carrier 106 through the housing 20.

In the closed position of the valve 130 shown in FIG. 1, the base 142 of the valve 130 is sealed against the seal member 134 thereby closing the ends of the recesses 150 and preventing fluid flow between the housing 20 of the quick connector 10 and the endform 12. When the valve 130 is in the open position shown in FIG. 6 and described hereafter, one end of the recesses 150 is open to at least one end preferably a plurality of circumferentially apertures 154 formed in the second cylindrical portion 144 of the valve 130. This opens fluid flow from the endform 12 through the recesses 150 and the apertures 154 in the valve 130 to the interior of the bore portion 21 of the housing 20 for fluid flow through the housing 20 to the endform 14 mounted in the opposite end 24 of the bore 22 of the housing 20.

The valve 130 is normally biased to the closed position shown in FIG. 1 by a biasing means 160. By example only, the biasing means 160 is in the form of a coil spring, one end of which seats against the flange 118 on the carrier 106 and the other end of which seats against the outer end of the first cylindrical portion 140 of the valve 130.

In use, prior to the attachment of the housing 20 to the endform 12, all of the components are mounted in the housing 20. The retainer 16 can also be premounted in one end of the housing 20 in the shipping position shown in FIG. 4. In the pre-assembled position, the biasing spring 160 biases the valve 130 to the flow blocking position shown in FIGS. 1 and 2.

The second end 26 of the housing 20 is then inserted over the end portion 11 of the end form 12 until the end of the endform 12 abuts the internal flange of the carrier 106. During this insertion, the spring fingers 102 of the retainer 100 forcibly engage the outer surface of the end form 12 to prevent reverse movement and separation from the end form 12 from the housing 20.

Figure 6:
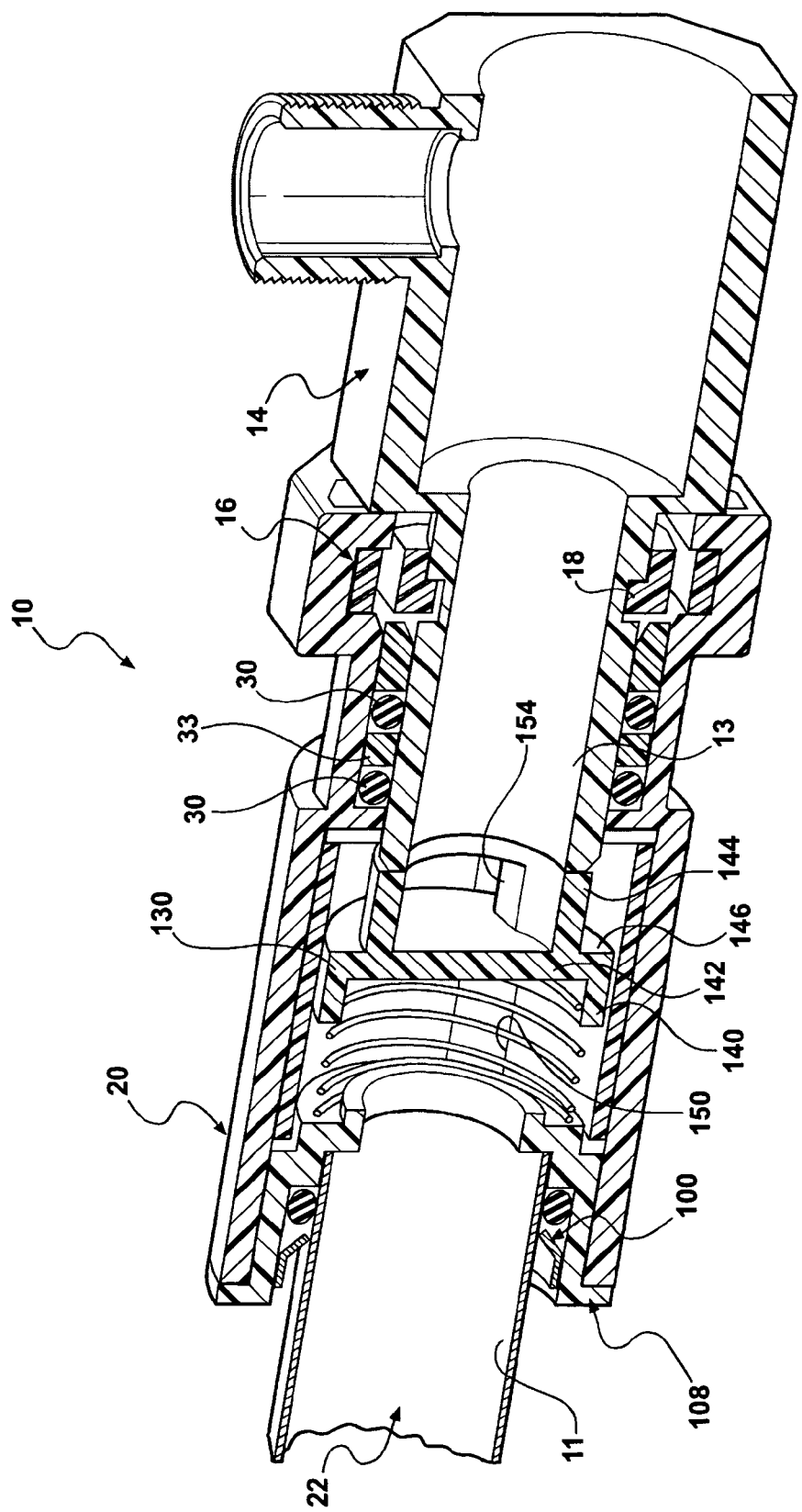
FIG. 6 is a longitudinal cross sectioned, perspective view of the fluid quick connector of FIG. 1 depicted in an open flow position.
Figure 7:
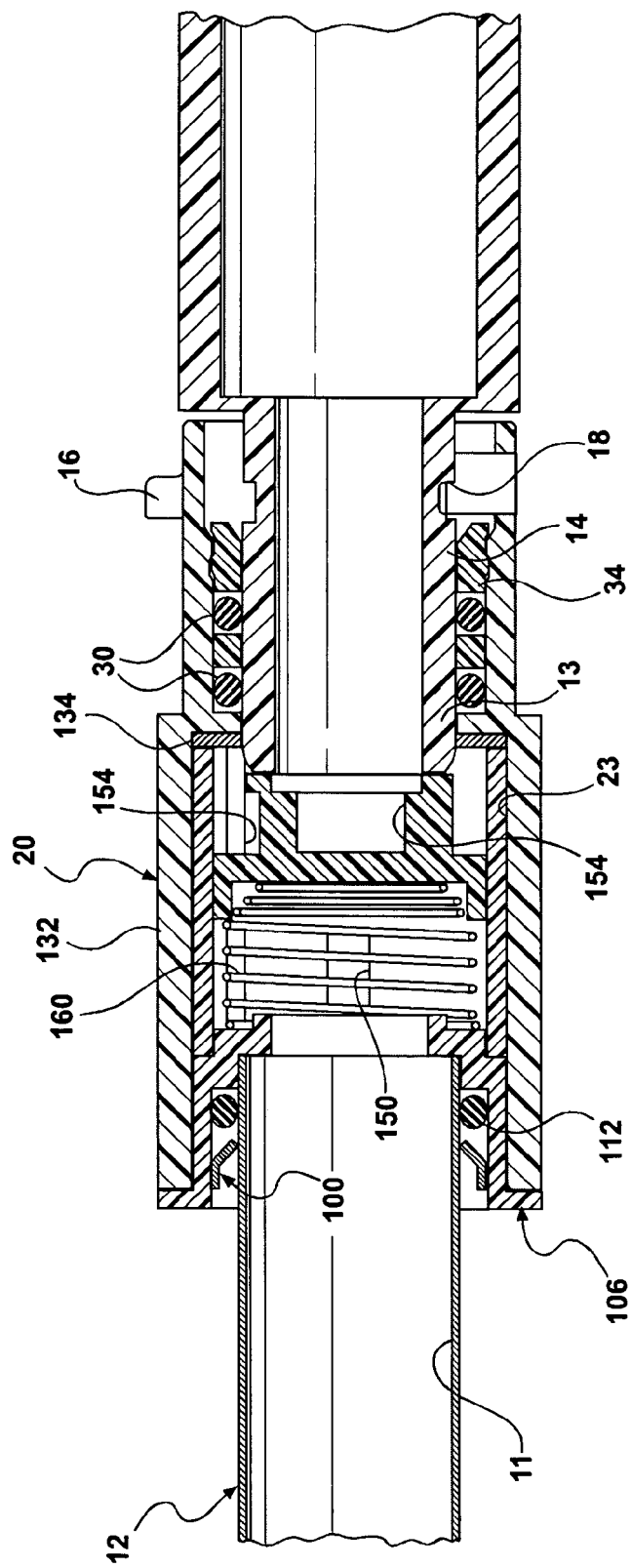
FIG. 7 is a longitudinal, cross sectional side view of the quick connector shown in FIG. 6.

Next, as shown in FIGS. 6 and 7, the tip end portion 13 of the endform 14 is inserted through the opposite end 24 of the housing 20. During continued insertion, the tip end 13 of the endform 14 will engage the end flange of the second cylindrical portion 144 of the valve 130. Continued forced insertion will overcome the biasing force of the spring 160 and cause the valve 130 to move axially within the housing 20 from the first position shown in FIG. 1 and to the second position shown in FIG. 7. In the second position shown in FIG. 7, which represents the full open or fluid flow position of the valve 130 and the fully inserted position of the endform 14 in the housing 20, the retainer 16 can then be transversely moved relative to the housing 20 to the fully latched position shown in FIG. 5 to lock the endform 14 in the housing 20.

In this position, as shown in FIGS. 6 and 7, the apertures 154 in the valve 130 are disposed in fluid communication with the recesses 150 in the sleeve 132. This establishes a fluid flow path between the endform 12, the recesses 150, the apertures 154, the valve 130 and the bore 22 to the second endform 14.

In conclusion, the present quick connector provides a quick, slide-on connection to an endform or stubout, which includes an internal shut off valve which is automatically responsive to insertion of an external endform to open fluid flow through the quick connector, which fluid flow otherwise shut off.

What is claimed is:

1. A fluid quick connector for mounting on an endform comprising:
   a housing having a bore extending between first and second ends;
   a first retainer carried at the first end of the housing for releasably latching the housing to the endform;
   a valve movable mounted in the bore for movement in a first direction to close the bore in housing to fluid flow, and oppositely in a second direction to open flow through the bore in the housing;
   a second retainer carried by the housing adapted for releasably latching another endform in the second end of the housing, the second retainer including a bore adjacent to the second end of the housing extending transversely to the bore extending between the first and second ends of the housing, the second retainer movable through the transverse bore and engageable with the another endform to latch the another endform to the housing;
   a biasing member biasing the valve in a first direction in the housing into sealing engagement with the housing closing fluid flow through the housing when the another endform is disengaged from the valve;
   at least one recess formed in the housing opening to the bore extending between the first and second ends of the housing;
   the valve operable to close off fluid communication between the recess in the housing and a remaining portion of the bore extending to the second end of the housing when in the closed position in the housing; and
   at least one aperture formed in the valve and disposed in fluid flow communication with the at least one recess in the housing when the valve is in first position to open fluid flow between the first and second ends of the housing.

2. The quick connector of claim 1 wherein the first retainer comprises:
   means for one way slide on engagement with the first endform.

3. The quick connector of claim 2 wherein the first retainer comprises:
   an annular member having a through bore mountable over the endform and a plurality of circumferentially arranged angled spring fingers slidably engageable with the endform.

4. The quick connector of claim 1 further comprising:

a carrier mountable in the first end of the housing, the carrier carrying the first retainer.

5. The quick connector of claim 4 further comprising:

a sleeve disposed in the housing; and seal means mounted between the sleeve and the housing for sealingly coupling the sleeve to the housing.

6. The quick connector of claim 1 further comprising:

a radially inwardly extending recess formed in the another endform; and a radially outward extending projection carried by the second retainer and engageable with the recess in the another endform to releasably latch the second retainer to the another endform.

7. The quick connector of claim 1 further comprising:

the at least one recess in the housing including a plurality of circumferentially spaced recesses; and at least one aperture in the valve comprises a plurality of circumferentially spaced apertures.

8. The quick connected of claim 1 further comprising:

a sleeve mounted in the bore in the housing, the at least one recess carried in the sleeve.

9. A fluid quick connector for mounting on an endform comprising:

a housing having a bore extending between first and second ends;

a first retainer carried at the first end of the housing adapted for releasably latching the housing to the endform;

another endform having a bore extending from one end;

a valve movably mounted in the bore for movement in a first direction to close the bore in housing to fluid flow and oppositely in a second direction to open flow through the bore in the housing;

a second retainer carried by the housing for releasably latching the another endform in the housing, the second retainer including a bore adjacent the second end of the housing extending transversely to the bore extending between the first and second ends of the housing, the second retainer movable though the transverse bore and engageable with the another endform to latch the another endform the housing;

a biasing member biasing the valve in a first direction in the housing into sealing engagement with the housing closing fluid flow through the housing when the another endform is disengaged with the valve;

at least one recess formed in the housing opening to the bore extending between the first and second ends of the housing;

the valve operable to close of fluid communication between the recess in the housing and a remaining portion of the bore extending to the second end of the housing when in the closed position in the housing; and at least one aperture formed in the valve and disposed in the fluid flow communication when the at least one recess in the housing when the valve is in first position to open fluid flow between the first and second ends of the housing.

10. The quick connector of claim 9 wherein the first retainer comprises:

means for one way slide on engagement with the first endform.

11. The quick connector of claim 10 wherein the first retainer comprises:

an annular member having a through bore mountable over the endform and a plurality of circumferentially arranged angled spring fingers engageable with the endform.

12. The quick connector of claim 9 further comprising:

a carrier mountable in the first end of the housing, the carrier carrying the first retainer.

13. The quick connector of claim 12 further comprising:

a sleeve disposed in the housing; and seal means mounted between the sleeve and the first housing for sealingly coupling the sleeve to the housing.

14. The quick connector of claim 9 further comprising:

a radially inwardly extending recess formed in the another endform; and a radially outward extending projection carried by the second retainer and engageable with the recess in the another endform to releasably latch the second retainer to the another endform.

15. The quick connector of claim 9 further comprising:

the at least one recess in the housing including a plurality of circumferentially spaced recesses; and at least one aperture in the valve comprises a plurality of circumferentially spaced apertures.

16. The quick connector of claim 9 further comprising:

a sleeve mounted in the bore in the housing, the at least one recess carried in the sleeve.

* * * * *